(12) United States Patent  
Kimura et al.

(10) Patent No.: US 7,866,352 B2
(45) Date of Patent: Jan. 11, 2011

(54) FILLING METHOD AND FILLING APPARATUS OF POWDER-PARTICLE MATERIAL IN COMPRESSION MOLDING

(75) Inventors: Harumoto Kimura, Hirakata (JP); Kazunari Hanaoka, Hirakata (JP); Yousuke Oyama, Ohbu (JP); Riichi Nakano, Ohbu (JP)

(73) Assignee: Matsui Mfg. Co., Ltd., Osaka (JP)

( * ) Notice: Subject to any disclaimer, the term of this patent is extended or adjusted under 35 U.S.C. 154(b) by 881 days.

(21) Appl. No.: 11/721,546

(22) PCT Filed: Dec. 16, 2005

(86) PCT No.: PCT/JP2005/023151

§ 371 (c)(1),
(2), (4) Date: Jun. 13, 2007

(87) PCT Pub. No.: WO2006/064912

PCT Pub. Date: Jun. 22, 2006

(65) Prior Publication Data

US 2008/0217802 A1   Sep. 11, 2008

(30) Foreign Application Priority Data

Dec. 17, 2004   (JP) .............................. 2004-365191

(51) Int. Cl.
 *B65B 31/02* (2006.01)
(52) U.S. Cl. ............................ 141/8; 141/11; 141/71; 141/98; 141/240; 425/98
(58) Field of Classification Search ..................... 141/1, 141/8, 11, 71, 98, 238, 240; 425/96, 98
See application file for complete search history.

(56) References Cited

U.S. PATENT DOCUMENTS 4,215,730 A * 8/1980 Oswald .......................... 141/1
4,813,818 A * 3/1989 Sanzone ..................... 141/250

(Continued)

FOREIGN PATENT DOCUMENTS

JP   04-152087   5/1992

(Continued)

OTHER PUBLICATIONS

International Search Report for corresponding Application No. PCT/JP2005/023151 mailed Mar. 20, 2006.

*Primary Examiner*—Timothy L Maust
*Assistant Examiner*—Nicolas A Arnett
(74) *Attorney, Agent, or Firm*—Renner, Otto, Boisselle & Sklar, LLP

(57) ABSTRACT

Powder-particle material in compression molding is transferred using air suction power and filled thinly, evenly and rapidly in a female mold. An adsorption pad 21 which is held so as to be freely movable in the vertical direction is provided at a movable cylinder 7, which can move in the horizontal direction in a space between a metal supply hopper 2 and a female mold 34 and rotate 180°, and powder particle material is laid in a scraped manner at the adsorption pad 21, adsorbed by actuating a vacuum pump 14, transferred to the female mold 34 in this state, turned around and caused to fall into the mold by terminating adsorption.

14 Claims, 19 Drawing Sheets

U.S. PATENT DOCUMENTS

| | | | | |
|---|---|---|---|---|
| 5,169,580 | A * | 12/1992 | Marcus | 264/115 |
| 5,492,662 | A * | 2/1996 | Kargol et al. | 264/119 |
| 5,494,627 | A * | 2/1996 | Kargol et al. | 264/119 |
| 5,551,486 | A * | 9/1996 | Hauser et al. | 141/1 |
| 6,035,905 | A * | 3/2000 | Griffin | 141/181 |
| 6,155,028 | A * | 12/2000 | Nagata et al. | 141/71 |
| 6,397,901 | B1 | 6/2002 | Saito et al. | |
| 6,474,371 | B1 * | 11/2002 | Ogawa et al. | 141/67 |
| 6,581,650 | B2 * | 6/2003 | Parks et al. | 141/12 |
| 6,881,048 | B1 * | 4/2005 | Tokita | 425/78 |
| 7,018,194 | B2 * | 3/2006 | Kitamura et al. | 425/193 |
| 7,178,562 | B2 * | 2/2007 | Ritz et al. | 141/2 |
| 7,255,139 | B2 * | 8/2007 | Tochio et al. | 141/125 |
| 7,348,220 | B2 * | 3/2008 | Ito et al. | 438/127 |
| 7,540,307 | B1 * | 6/2009 | Khambete | 141/5 |
| 7,621,300 | B2 * | 11/2009 | Bonney et al. | 141/83 |
| 2001/0018029 | A1 | 8/2001 | Ogawa et al. | |

FOREIGN PATENT DOCUMENTS

| | | |
|---|---|---|
| JP | 11-049101 | 2/1999 |
| JP | 2001-062858 | 3/2001 |
| JP | 2001-226701 | 8/2001 |
| JP | 2002-059442 | 2/2002 |
| JP | 2003-223901 | 8/2003 |
| JP | 2003-231145 | 8/2003 |
| JP | 2003-260719 | 9/2003 |

* cited by examiner

F I G. 2
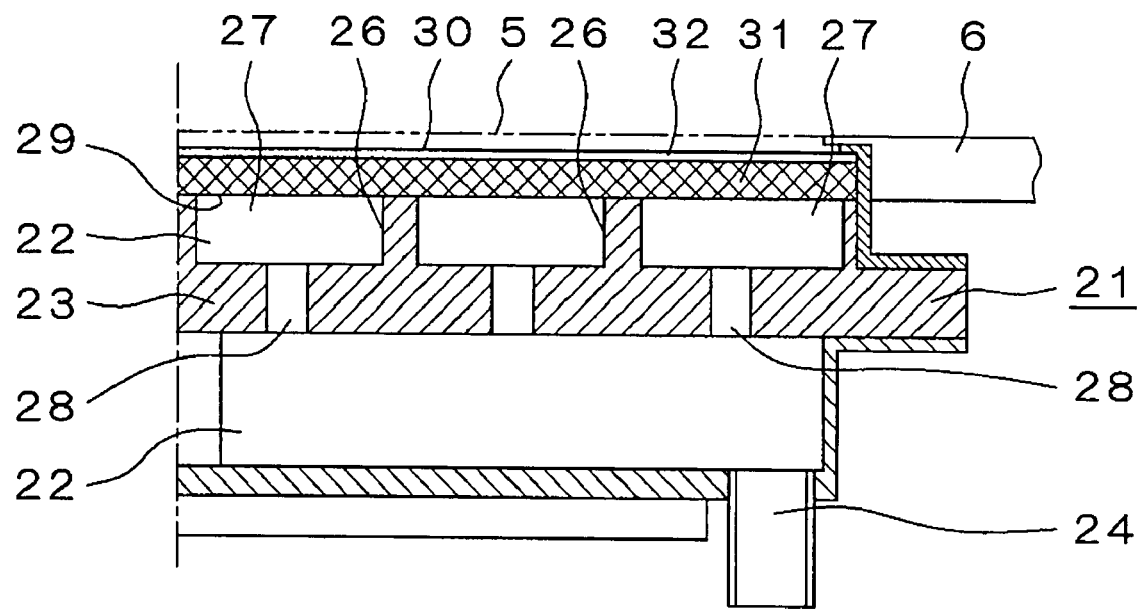

F I G. 1 5
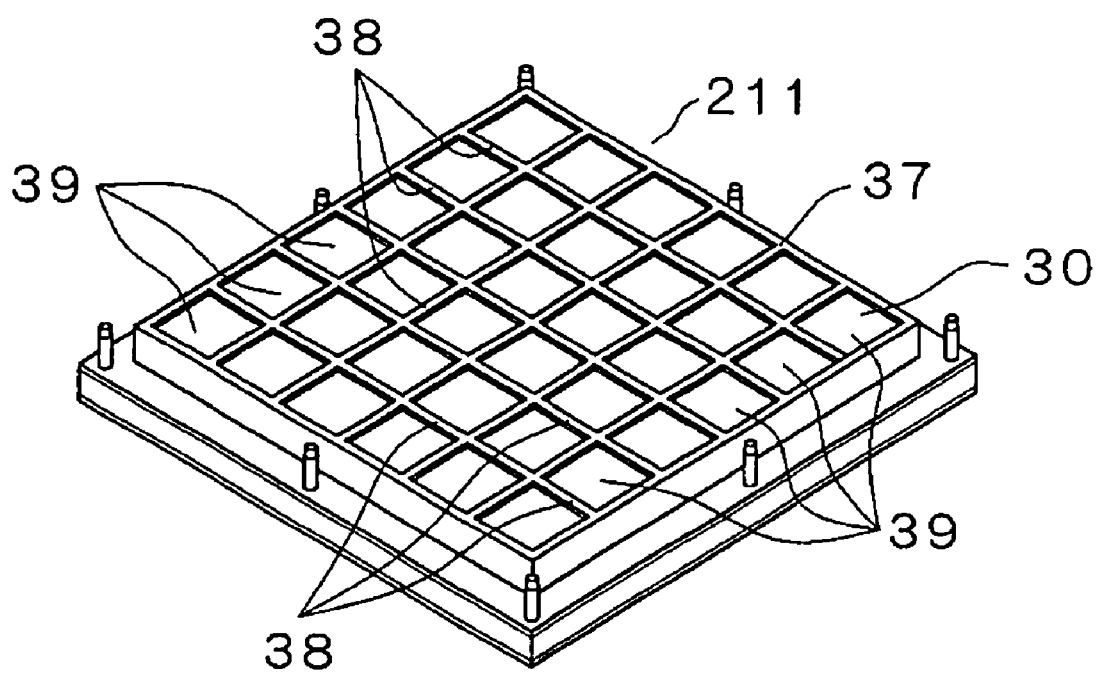

F I G. 1 6
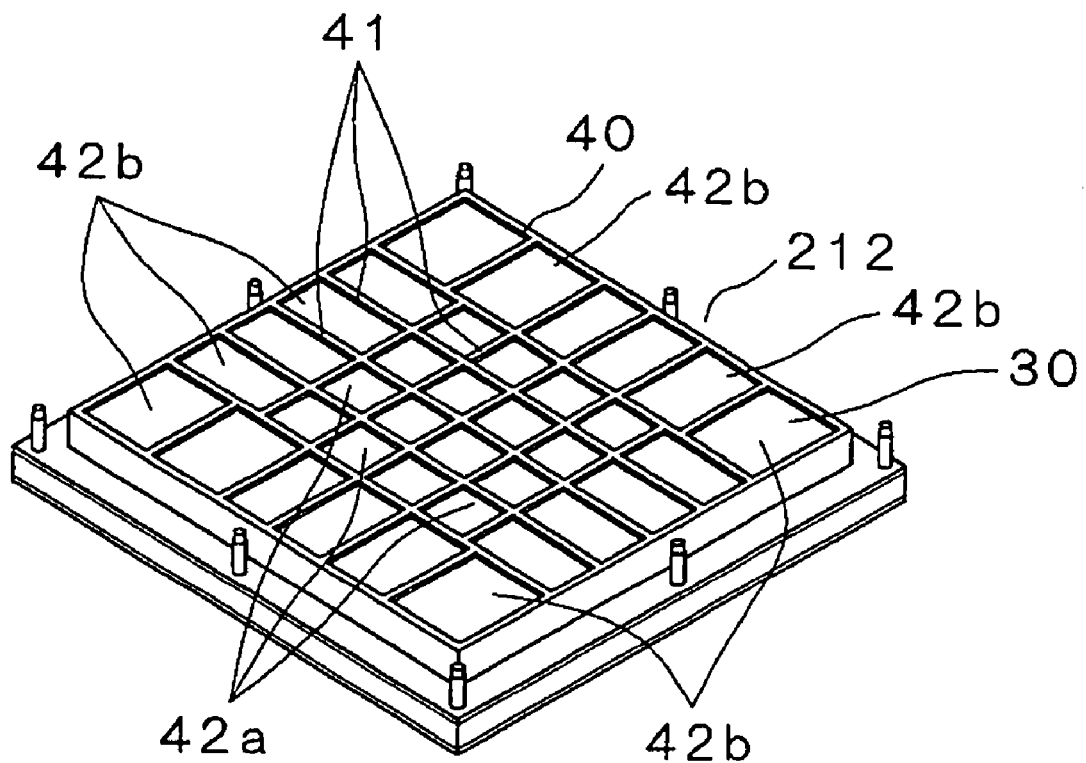

FIG. 17
CONVENTIONAL ART
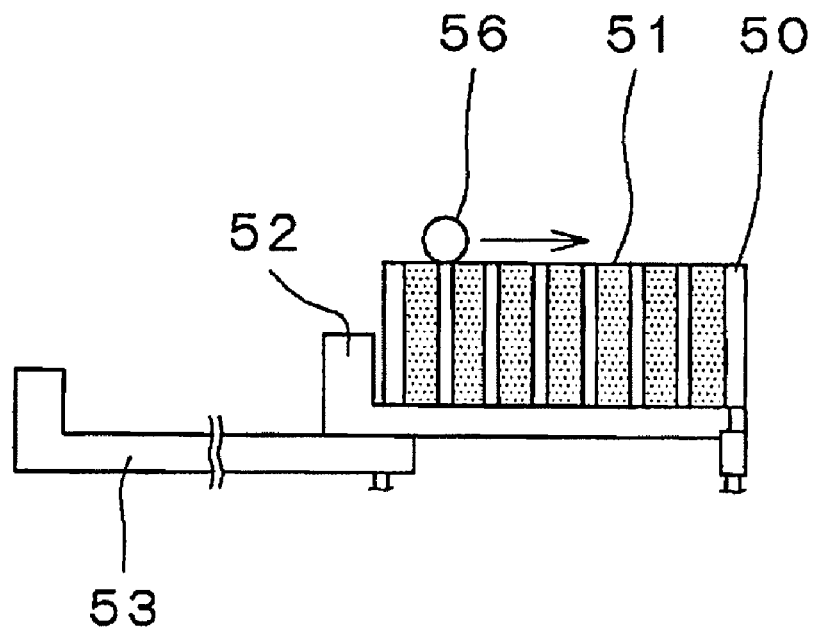
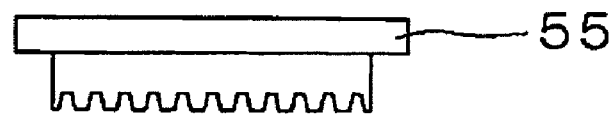
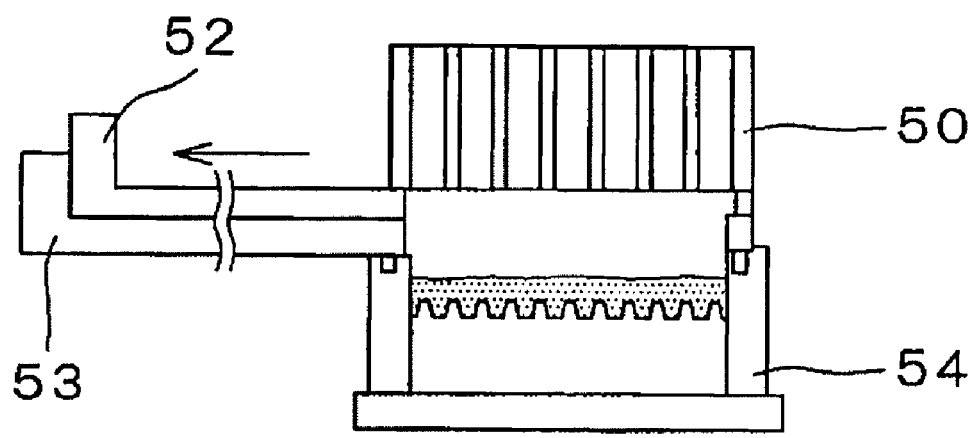

FILLING METHOD AND FILLING APPARATUS OF POWDER-PARTICLE MATERIAL IN COMPRESSION MOLDING

This application is the national phase under phase 35 U. S. C. §371 of PCT International Application No. PCT/JP2005/023151 which has an International filing date of Dec. 16, 2005, which designated the United States of America.

TECHNICAL FIELD

The present invention relates to a filling method and a filling apparatus of powder-particle material in compression molding such as pressing.

BACKGROUND ART

In compression molding, a mold is heated to a high temperature in order to melt and react powder-particle material. An example of an object of such compression molding in a high-temperature heating state is manufacturing of a laminar product, e.g., a separator for a fuel cell.

By the way, it is extremely important for a separator for a fuel cell to have high gas impermeability, high electrical conductivity and low profile irregularity. Although a separator of an early date is obtained by machining of a graphite plate or the like for this reason, attempts by press working are increasing in recent years upon machining time and cost request.

More specifically, mentioned above is a method for inputting a predetermined amount of powder-particle raw material into a mold and then applying heat and pressure with a pressing machine so as to obtain a laminar separator, which enables manufacturing in a shorter time and at a lower cost than one manufactured by other machining.

As affairs now stand, however, a separator which is actually manufactured still has high profile irregularity and does not reach a required level. One reason thereof is that it is difficult to distribute powder-particle raw material thinly and evenly at the entire bottom face of a female mold when inputting powder-particle raw material.

A common solution for such a problem is technique disclosed in Japanese Patent Application Laid-Open No. 2001-62858 (Patent Document 1).

More specifically, denoted at 50 in FIG. 17 is an input portion having a number of input ports 51, and denoted at 52 is a slide plate which is provided below the input portion 50 so as to be slidable between a position for closing all the input ports 51 and a position for opening all the input ports 51. Moreover, denoted at 53 is a base for supporting the input portion 50 and the slide plate 52, denoted at 54 is a bottom mold (female mold) and denoted at 55 is a top mold (male mold).

In the structure described above, powders and particles are inputted into the input portion 50 and then set in the bottom mold 54 after excess is removed by scraping with a scraping rod 56 to obtain a certain amount. Next, when the slide plate 52 is slid so as to open the input ports 51 in series from an end, the powders and particles fall into the bottom mold 54. Finally, the input portion 50 and the base 53 are moved and then pressing is performed with the top mold 55.

With the above conventional technique, it is possible to obtain a certain amount of powders and particles inputted into the input portion 50 with the scraping rod 56. However, it is difficult to improve the profile irregularity of the final product since the falling state of the powders and particles in falling from the input portion 50 into the bottom mold 54 may possibly be uneven for a certain movement speed of the slide plate.

Technique disclosed in Japanese Patent Application Laid-Open No. 2003-223901 (Patent Document 2) is known as what can prevent uneven distribution of powders and particles described above for a certain falling state at the point of falling into the bottom mold.

More specifically, denoted at 60 in FIG. 18 is a female mold and denoted at 61 is a powder supply box which is in close contact with the upper face of the female mold 60 and has a shape of frame having open upper and lower sides. Powdered raw material 62 is loaded in the powder supply box 61.

In addition, the powder supply box 61 is slid while the powdered raw material 62 is inputted into the female mold 60 and the upper face of the female mold 60 is scraped.

From what is shown in Patent Document 2, it can be understood that improvements are made to enable even input of the powdered raw material 62 into the female mold 60.

However, since the above conventional technique is for scraping the upper face of the female mold 60, scraping is impossible when the powdered raw material 62 is inputted thinly at the internal bottom face of the female mold 60.

Moreover, when the upper face of the female mold 60 is scraped, the scraped powdered raw material 62 is diffused to the periphery of the upper face of the female mold 60. Since the female mold 60 is at a high temperature during press working and even before pressing by preheating, there is a problem that the diffused powders and particles gather and attach and maintenance takes a lot of trouble.

It should be noted that a method for even filling without scraping is disclosed in Japanese Patent Application Laid-Open No. H11-49101 (Patent Document 3). More specifically, denoted at C in FIG. 19 is a container (mold) and denoted at S is a cavity.

Denoted at G is a supply hopper which is laid at the upper face of the container C, and the supply hopper G has a grid g2 at the bottom face thereof and is provided with a cover h2 at the upper face thereof. Denoted at h1 is an air suction blow port provided at the cover h2. Powder P is retained in the supply hopper G.

By air tapping (repeatedly putting inside of the supply hopper G and the container C into a high-pressure state and a low-pressure state) through the air suction blow port h1 at the device, the powder P is stirred and falls evenly from the grid g2 into the cavity S. Then the powder P is separated at the face of the grid g2 when the supply hopper G is taken up in this state.

With this method, it is possible to fill powder P evenly in a mold without using means such as scraping means. However, the method cannot be applied to powder of all kinds of quality of material and, for example, resin powders and particles including carbon, such as the raw material of a separator for a fuel cell, leak and fall from the grid g2 when the supply hopper G is taken up and cannot be separated from the mold successfully.

[Patent Document 1] Japanese Patent Application Laid-Open No. 2001-62858

[Patent Document 2] Japanese Patent Application Laid-Open No. 2003-223901

[Patent Document 3] Japanese Patent Application Laid-Open No. H11-49101

DISCLOSURE OF THE INVENTION

Problems to be Solved by the Invention

The present invention has been suggested in view of such problems and provides a filling method and a filling apparatus of powder-particle material in compression molding, with which it becomes possible to input powders and particles thinly, evenly and rapidly into a female mold without using technical means such as air tapping or filling powders and particles directly into a mold by scraping.

Means for Solving the Problems

In order to solve the above problems, a filling method of powder-particle material according to the first aspect comprises the steps of: laying powder-particle material in a scraped manner on an adsorption pad; adsorbing powder-particle material at an adsorption face of the adsorption pad by air suction; transferring the adsorption pad to an upper side of a female mold; and filling powder-particle material by stopping air suction to cause powder-particle material to fall into the female mold.

A filling method of powder-particle material according to the second aspect comprises the steps of laying powder-particle material in a scraped manner on a permeable holder pad; adsorbing powder-particle material, which is laid on the holder pad, at an adsorption face provided at a lower face of an adsorption pad by air suction; transferring the adsorption pad to an upper side of a female mold; and filling powder-particle material by stopping air suction to cause powder-particle material to fall into the female mold.

A filling method of powder-particle material according to the third aspect is the filling method of powder-particle material according to the first aspect, comprising a step of turning the adsorption pad upside down when transferring the adsorption pad to the upper side of the female mold.

A filling apparatus of powder-particle material according to the fourth aspect comprises: a material supply hopper for retaining powder-particle material for compression molding and discharging powder-particle material from a supply port at a lower portion; an adsorption pad for receiving discharged powder-particle material at a lower side of the material supply hopper; scraping means for evenly scraping a predetermined amount of powder-particle material, which is laid on the adsorption pad, depending on a female mold; air suction means for adsorbing and holding powder-particle material, which is continuously laid in a scraped manner on the adsorption pad; and transferring means which can transfer the adsorption pad and freely turn the adsorption pad upside down in a space between the material supply hopper and the female mold with the powder-particle material being adsorbed and held, wherein the air suction means stops air suction to cause powder-particle material to fall from the adsorption pad into the female mold.

A filling apparatus of powder-particle material according to the fifth aspect comprises: a material supply hopper for retaining powder-particle material for compression molding and discharging powder-particle material from a supply port at a lower portion; a holder pad for receiving discharged powder-particle material at a lower side of the material supply hopper; scraping means for evenly scraping a predetermined amount of powder-particle material, which is laid on the holder pad, depending on a female mold; an adsorption pad having an adsorption face at a lower face; air suction means for adsorbing and holding powder-particle material, which is continuously laid in a scraped manner on the holder pad, at the adsorption face of the adsorption pad; and transferring means which can transfer the adsorption pad in a space between the material supply hopper and the female mold with the powder-particle material being adsorbed and held, wherein the air suction means stops air suction to cause powder-particle material to fall from the adsorption pad into the female mold.

A filling apparatus of powder-particle material according to the sixth aspect is the filling apparatus of powder-particle material in compression molding according to the fourth aspect or the fifth aspect, wherein the adsorption pad has a cavity portion, which communicates with the air suction means, inside thereof and comprises a vent member consisting of sintered metal or a proper filter at the adsorption face.

A filling apparatus of powder-particle material according to the seventh aspect is the filling apparatus of powder-particle material in compression molding according to any one of the fourth aspect to the sixth aspect, wherein the adsorption pad has a cavity portion inside thereof and the cavity portion is sectioned into a number of cubicles.

A filling apparatus of powder-particle material according to the eighth aspect is the filling apparatus of powder-particle material in compression molding according to any one of the sixth aspect and the seventh aspect, wherein a section sheet for sectioning external surface of the vent member into a number of cubicles is provided.

A filling apparatus of powder-particle material according to the ninth aspect is the filling apparatus of powder-particle material in compression molding according to the eighth aspect, wherein the cubicles of the section sheet are sectioned so as to have a smaller area in a central portion than in a periphery portion of the external surface of the vent member.

A filling apparatus of powder-particle material according to the tenth aspect is the filling apparatus of powder-particle material in compression molding according to any one of the fifth aspect to the seventh aspect, wherein the holder pad comprises a vent member consisting of sintered metal or a proper filter.

EFFECTS OF THE INVENTION

The following effects can be obtained with the present invention.

With the filling method of powder-particle material according to the first aspect, powder-particle material can be filled in a mold rapidly and evenly since powder-particle material adsorbed evenly at the adsorption pad by scraping is caused to fall from the whole area of the adsorption pad at once by stopping air suction at an upper side of the female mold. Accordingly, the production efficiency is enhanced and the profile irregularity of the product is improved and, furthermore, the problem of diffusion of powder-particle material to the periphery of the mold and melting and attachment thereof is solved since scraping at the mold face is not performed.

With the filling method of powder-particle material according to the second aspect wherein powder-particle material is absorbed at the lower face of the adsorption pad, a step of turning the adsorption pad upside down is unnecessary and it is possible to simplify steps.

With the filling method of powder-particle material according to the third aspect, it is possible to adsorb powder-particle material evenly since powder-particle material is scraped by a predetermined thickness directly at the upper face of the adsorption pad, although a step of turning the adsorption pad upside down is necessary.

With the filling apparatus of powder-particle material in compression molding according to the fourth aspect, it is possible to perform transferring to a female mold with a predetermined amount of powder-particle material being adsorbed at the adsorption pad by air suction, cause fall into the mold from the whole area of the adsorption pad at once by stopping air suction and perform rapid and even filling.

With the filling apparatus of powder-particle material in compression molding according to the fifth aspect wherein powder-particle material scraped on a holder pad is adsorbed at the lower face of the adsorption pad and transferred in this state, a turning device for turning the adsorption pad upside down becomes unnecessary and it is possible to simplify the apparatus and cut back space.

With the filling apparatus of powder-particle material in compression molding according to the sixth aspect wherein the adsorption pad has a cavity portion inside thereof and a vent member consisting of sintered metal or a proper filter is provided at the adsorption face, it is possible to reliably adsorb powder-particle material and cause powder-particle material to fall.

With the filling apparatus of powder-particle material in compression molding according to the seventh aspect wherein the adsorption pad has a cavity portion inside thereof and the cavity portion is sectioned into a number of cubicles, it is possible to adsorb powder-particle material at the whole area of the adsorption face evenly.

With the filling apparatus of powder-particle material in compression molding according to the eighth aspect wherein a section sheet is provided at the external surface of the vent member, it is possible to set various kinds of patterns of the adsorption amount at the entire adsorption face by setting the section sheet to an arbitrary section pattern, since powder-particle material is not adsorbed at a portion covered with the section sheet. Moreover, by being sectioned by the section sheet, falling object into the female mold rarely moves to other places and it becomes possible to perform filling in a required pattern as a result.

With the filling apparatus of powder-particle material in compression molding according to the ninth aspect wherein the cubicles of the section sheet are constructed to have a smaller area in a central portion than in a periphery portion of the external surface of the vent member, the adsorption amount of powder-particle material at the periphery portion becomes relatively large and the common problem of thinning of the periphery portion of the product in compression molding can be solved.

With the filling apparatus of powder-particle material in compression molding according to the tenth aspect wherein a vent member is also provided at the holder pad, it is possible to adsorb powder-particle material with the adsorption pad more reliably.

BRIEF DESCRIPTION OF THE DRAWINGS

FIG. 2 is an enlarged detail sectional view of the part A of FIG. 1;

FIG. 15 is a perspective view showing an example of an adsorption pad to be used in Embodiment 3 of the present invention;

FIG. 16 is a perspective view showing another example of an adsorption pad in Embodiment 3 of the present invention;

FIG. 17 is a side view showing a material supply method in a separator manufacturing apparatus as a conventional powder-particle material filling apparatus;

DESCRIPTION OF THE NUMERALS

1 Powder-particle Material Filling Apparatus
2 Material Supply Hopper
3 Powder-particle Material
4 Supply Port
5 Scraping Means
7 Movable Cylinder
8 Turning Shaft
14 Vacuum Pump
14A Air Suction Means
20 Transfer Means
21 Adsorption Pad
22 Cavity Portion
23 Partition
27 Cubicle
29 Adsorption Face
30 Vent Member
31 Sintered Metal
32 Filter
34 Female Mold
35 Powder-particle Layer
36 Holder Pad
37 Section Sheet
39 Cubicle
40 Section Sheet
42a Cubicle
42b Cubicle
211 Adsorption Pad
212 Adsorption Pad

BEST MODE FOR IMPLEMENTING THE INVENTION

The following description will explain the best mode for implementing the present invention with reference to the drawings. It should be noted that the present invention is not limited by the present embodiments. Moreover, in the explanation of the present embodiments, like codes are attached to parts providing like structure and effect and duplicated explanation will not be provided.

Embodiment 1

Figure 1:
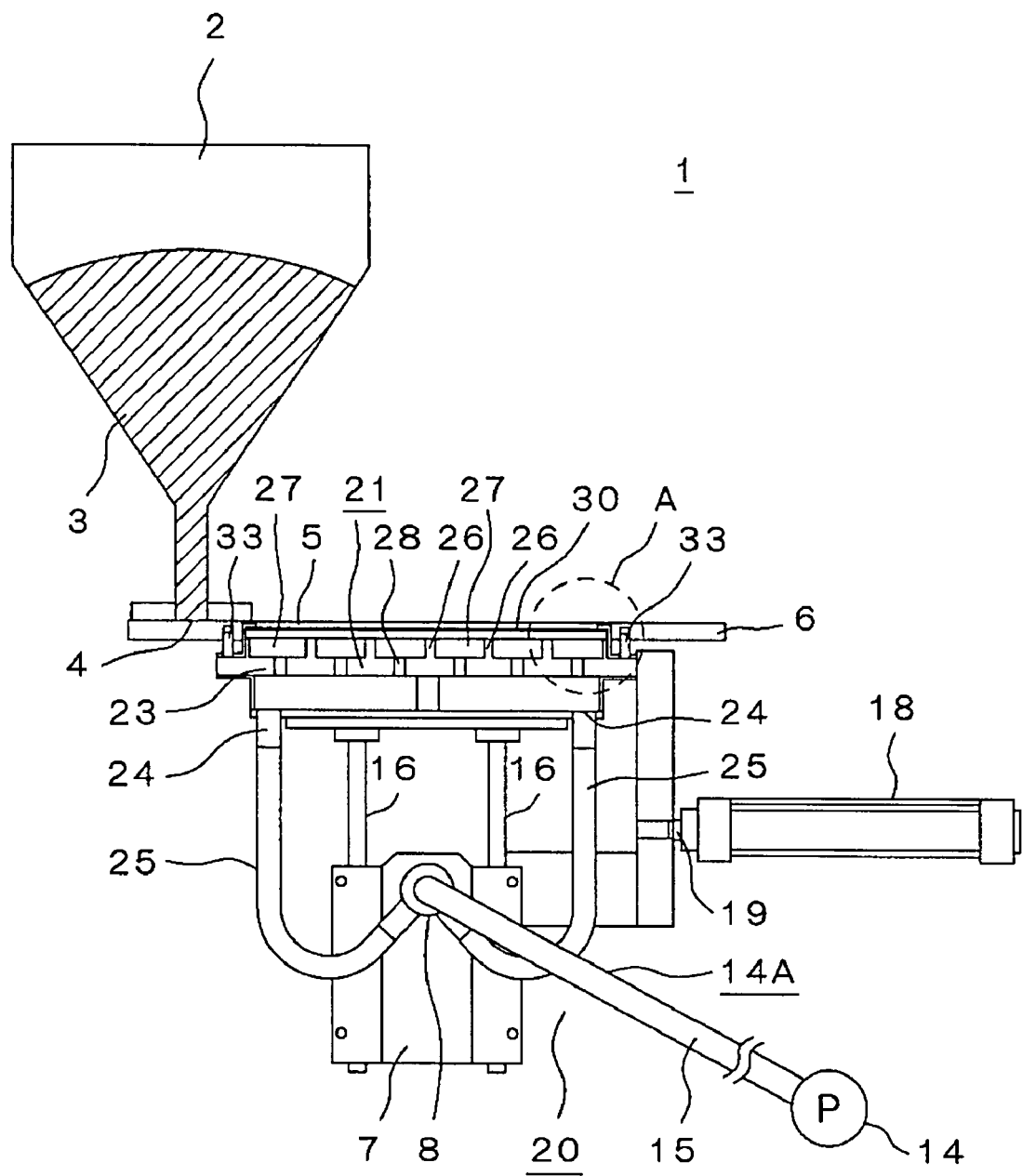
FIG. 1 is a vertical sectional view of an essential part of a filling apparatus of powder-particle material in compression molding according to Embodiment 1 of the present invention.

FIG. 1 shows a vertical sectional view of a powder-particle material filling apparatus according to an embodiment of the present invention and FIG. 2 shows an enlarged detail sectional view of the part A of FIG. 1.

Denoted at 1 in the drawing is the entire powder-particle material filling apparatus. Denoted at 2 is a material hopper for retaining powder-particle material 3. The material hopper 2 has a supply port 4 for discharging material at a lower end portion and proper material is replenished from the upper side.

The powder-particle material 3 is powders and particles such as resin, carbon or metal, or mixture thereof.

Denoted at 5 is scraping means consisting of a proper casing board 6 and is provided below the material hopper 2 so as to be able to freely reciprocate, and the powder-particle material 3 is scraped by the relative motion of the supply port 4 and the casing board 6.

Figure 3:
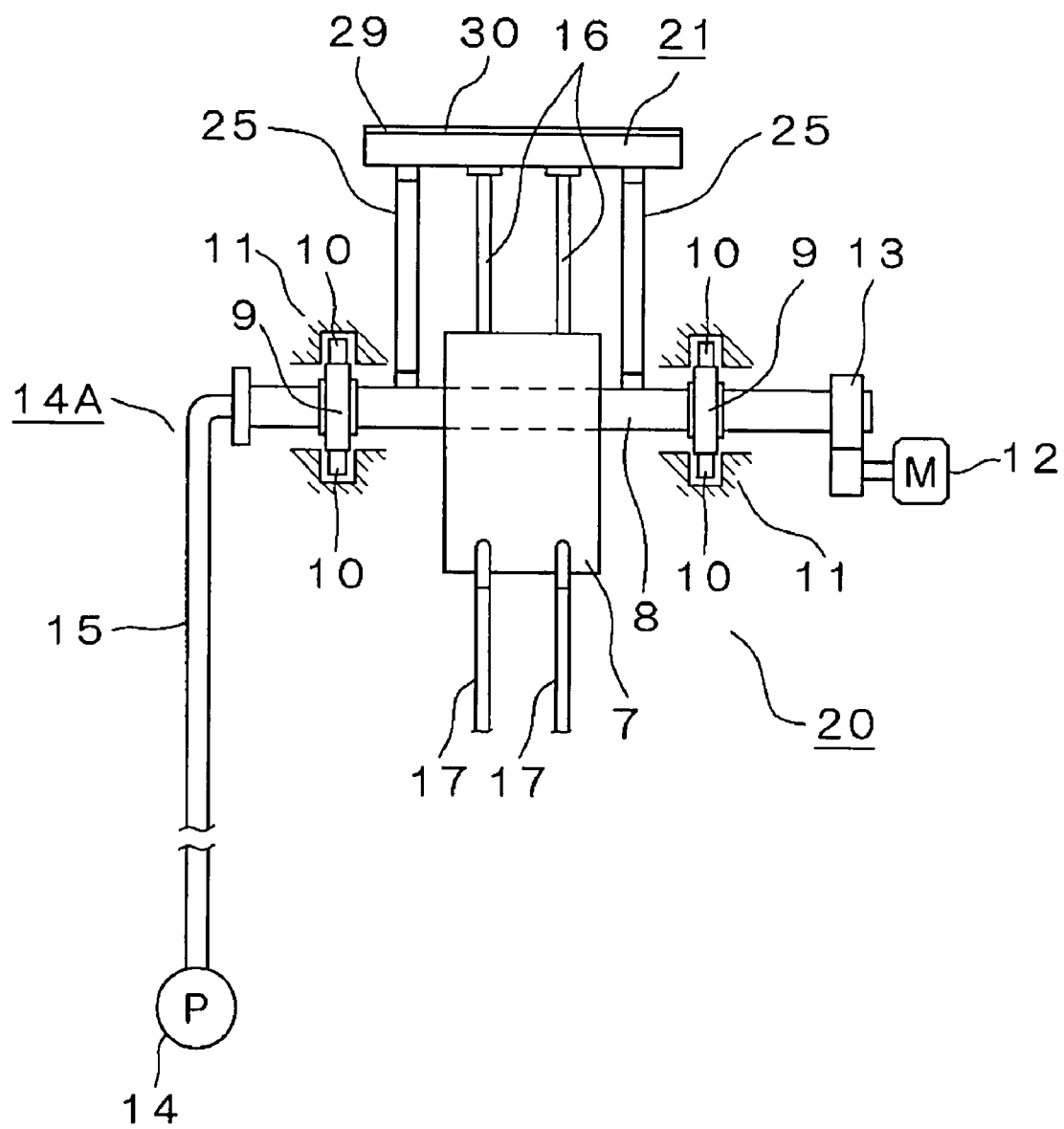
FIG. 3 is a simplified side view of the filling apparatus of powder-particle material shown in FIG. 1.

Denoted at 7 is a movable cylinder constituting the body of the powder-particle material filling apparatus 1 and is attached to a hollow turning shaft 8. In addition, as shown in FIG. 3, the turning shaft 8 is supported, so as to be freely rotatable, by support plates 9 which are arranged on either side of the movable cylinder 7. Moreover, the support plates 9 have rollers 10 on upper and lower sides and are guided by a guide 11 and supported so as to be freely movable backward and forward of the paper face.

A motor 12 is provided at one end portion of the turning shaft 8 via a gear mechanism 13, and a hose 15 of a vacuum pump 14 or a blower is connected with the other end portion and communicates with an internal hollow portion.

Denoted at 14A is air suction means composed of the vacuum pump 14, the hose 15 and the hollow turning shaft 8, inlet hoses 25, which will be described later, and the like.

Denoted at 16 are actuating rods of the movable cylinder 7 and an adsorption pad 21, which will be explained later, is held at an end portion thereof.

The actuating rods 16 can move back and forth in the vertical direction from the movable cylinder 7 by air supplied and exhausted to and from the movable cylinder 7.

Denoted at 17 are air hoses for supplying and exhausting compressed air to and from the movable cylinder 7.

Moreover, denoted at 25 are the inlet hoses which are provided to make communication between the hollow turning shaft 8 and the inlet ports 24 (which will be explained later) of the adsorption pad 21.

In addition, denoted at 18 in FIG. 1 is a fixed cylinder which is disposed adjacent to a side portion of the movable cylinder 7, and the fixed cylinder 18 has an actuating bar 19 which can freely move back and forth in the horizontal direction by an actuation thereof.

In addition, the movable cylinder 7 and the turning shaft 8 can be moved in an integrated manner in the horizontal direction along the guide 11 by the back-and-forth action of the actuating bar 19. In addition to this, the turning shaft 8 and the movable cylinder 7 can be rotated 180° in an integrated manner by the motor 12 and the gear mechanism.

The movable cylinder 7, the fixed cylinder 18 and the motor 12 mentioned above compose transfer means 20 for transferring the adsorption pad 21 and turning the adsorption pad 21 upside down in a stereoscopic space between the material hopper 2 and a female mold 34, which will be explained later.

Denoted at 21 is the adsorption pad mentioned above, which is held at an end portion (upper end portion) of the actuating rods 16 and can be moved in the vertical direction by an action of the actuating rods 16 and moved in the horizontal direction together with the movable cylinder 7 by an action of the fixed cylinder 18. In addition, the adsorption pad 21 can be rotated 180° together with the movable cylinder 7 by the rotation of the motor 12 and can be turned upside down and restored to the original state.

In addition, the adsorption pad 21 has a plane in a roughly rectangular shape and has a cavity portion 22 inside thereof. The cavity portion 22 is partitioned into an upper side and a lower side with a partition 23, an upper cavity portion 22 has an open upper face and a lower cavity portion 22 communicates with the turning shaft 8, the hose 15 and the vacuum pump 14 via the inlet hoses 25 by the inlet ports 24.

Moreover, the upper cavity portion 22 is sectioned into a number of cubicles 27 by a section 26 and each cubicle 27 communicates with the lower cavity portion 22 by a communicating hole 28 which is provided at the partition 23.

Denoted at 29 is an upper face opening of the upper cavity portion 22, i.e. an adsorption face, and denoted at 30 is a vent member which is laid on the section 26 and with which the adsorption face 29 is coated. The vent member 30 is retained in a horizontal position since the section 26 also performs positioning. In addition, although sintered metal 31 and a resin filter 32 are used in piles for the vent member 30 as an example, the present invention does not need to be limited to this.

It should be noted that proper pins 33 are provided at the periphery portion of the adsorption pad 21 so as to perform positioning in relation to the scraping means 5.

The following description will explain a manufacturing step by a filling apparatus of powder-particle material in the compression molding with reference to FIG. 4 to FIG. 9.

Figure 4:
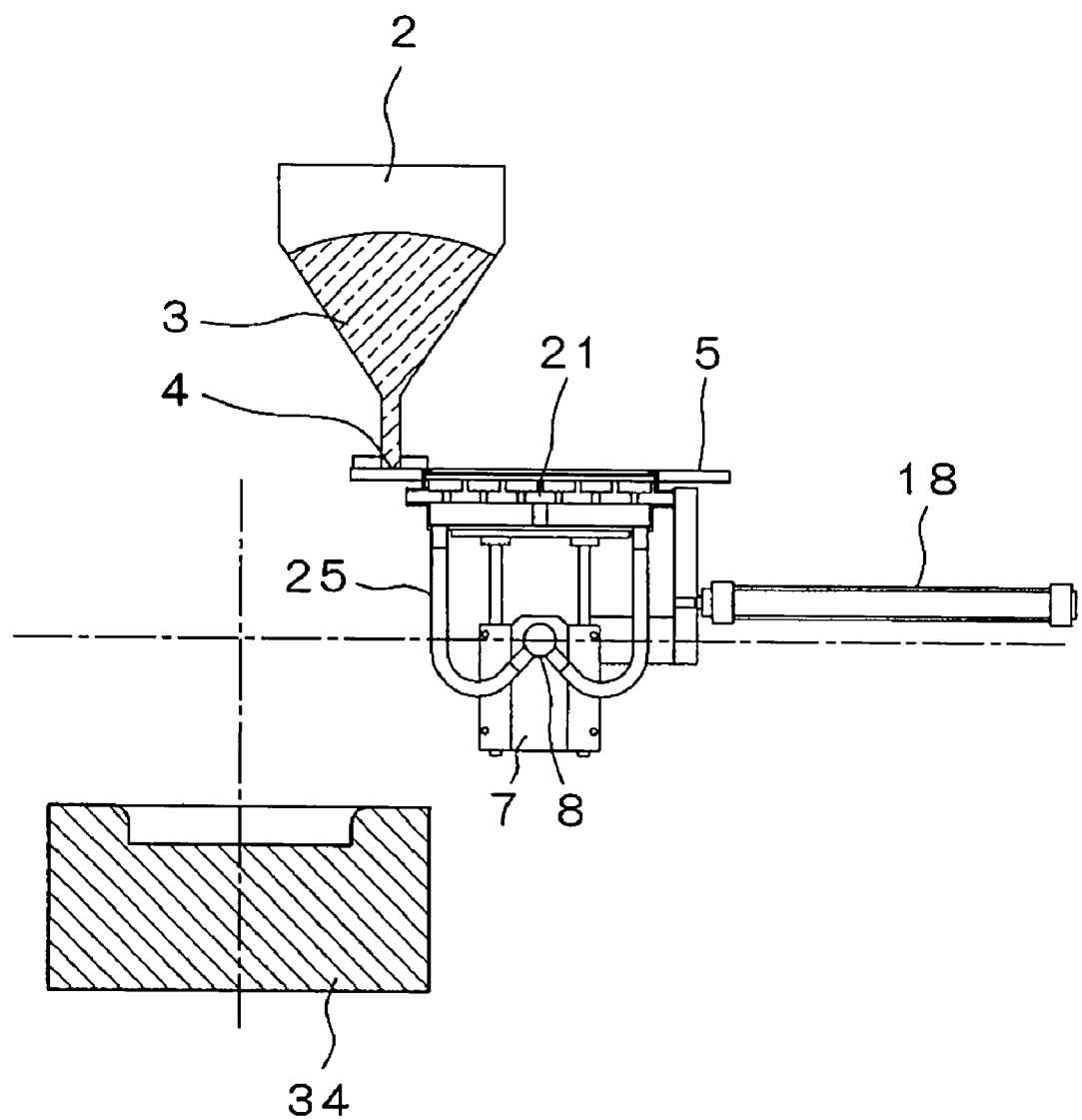
FIG. 4 is a vertical sectional view showing a waiting step in a compression molding step of the filling apparatus of powder-particle material shown in FIG. 1.

FIG. 4 shows a waiting state. The fixed cylinder 18 and the movable cylinder 7 are at a stop. It should be noted that denoted at 34 is the female mold, which is at a predetermined position and is preheated.

Figure 5:
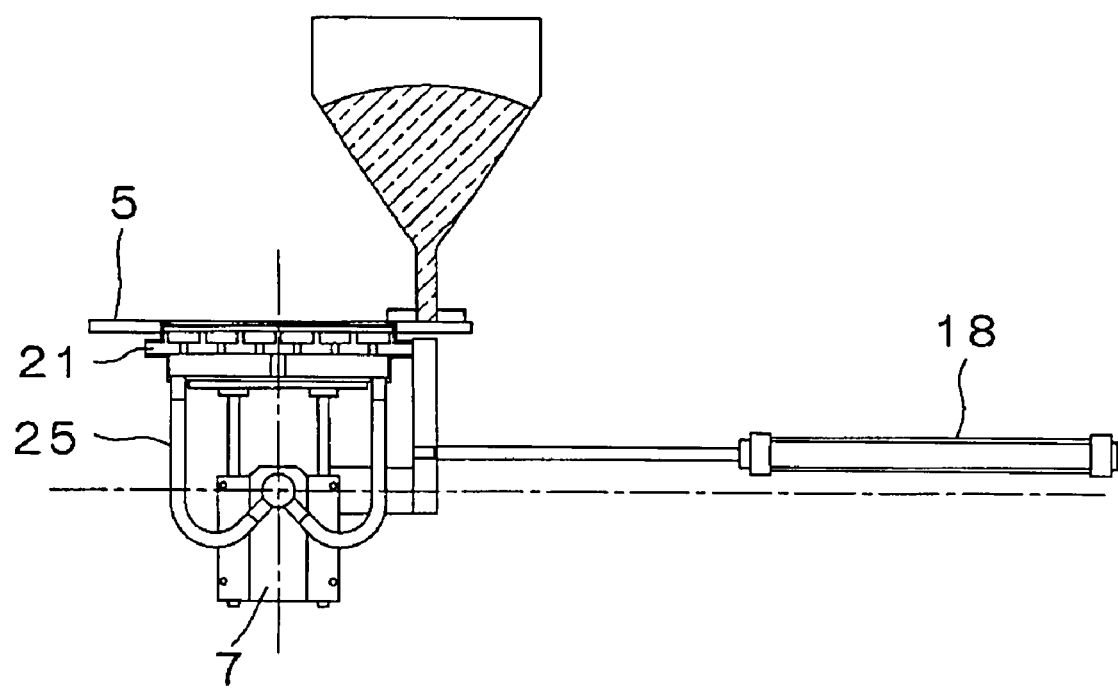
FIG. 5 is a vertical sectional view showing a scraping step in a compression molding step of the same filling apparatus.

FIG. 5 shows a scraping step. More specifically, the fixed cylinder 18 actuates, and the adsorption pad 21 and the scraping means 5 move in the horizontal direction together with the movable cylinder 7 at the lower face of the supply port 4 of the material supply hopper 2. The powder-particle material 3 is then scraped evenly on the vent member 30 which is set at the adsorption face 29 of the adsorption pad 21. The present embodiment is set so that the members make one round trip in the horizontal direction.

Figure 6:
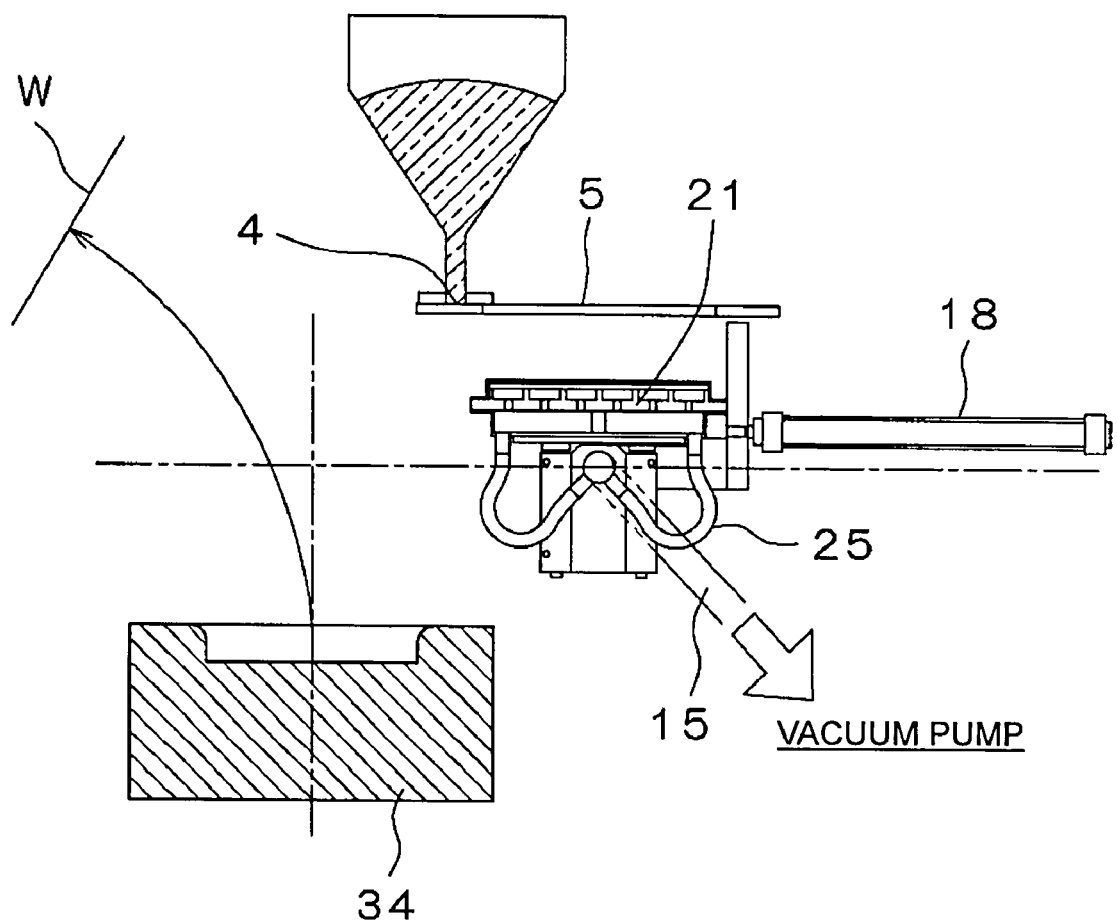
FIG. 6 is a vertical sectional view showing an adsorbing step of powder-particle material in a compression molding step of the same filling apparatus.

FIG. 6 shows an adsorbing step. More specifically, the vacuum pump 14 actuates and air suction from the adsorption pad 21 generates adsorption power at the adsorption face 29, so that the powder-particle material 3 is adsorbed on the vent member 30. At the same time, the actuating rods 16 of the movable cylinder 7 descend and the adsorption pad 21 is separated from the scraping means 5. In this step, adsorption power acts evenly on the whole area of the vent member 30 since inside of the adsorption pad 21 is sectioned into the cubicles 27.

Moreover, a product W which is shaped last time may be taken out in this step.

Figure 7:
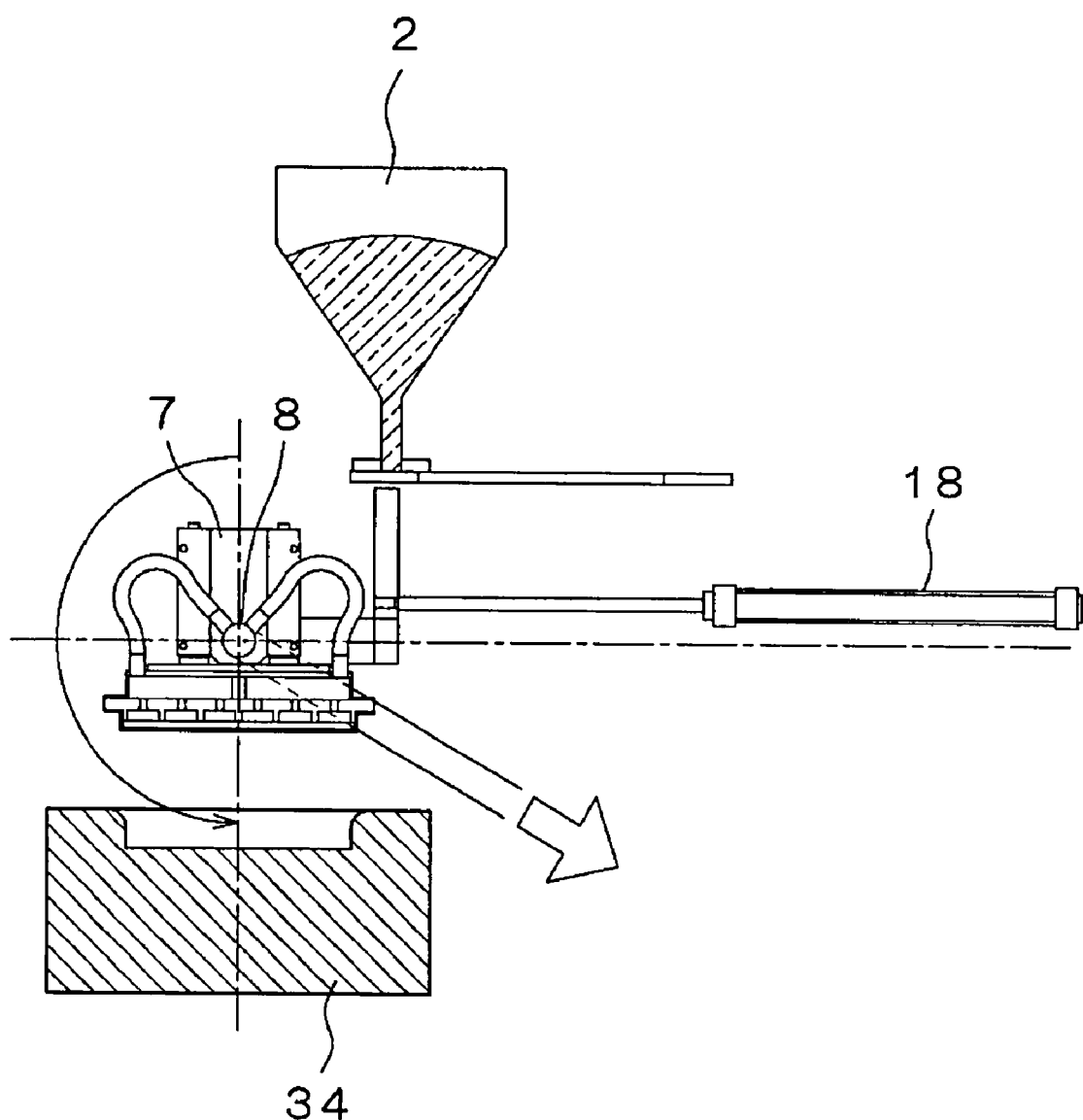
FIG. 7 is a vertical sectional view showing a transferring step of an adsorption pad in a compression molding step of the same filling apparatus.
Figure 8:
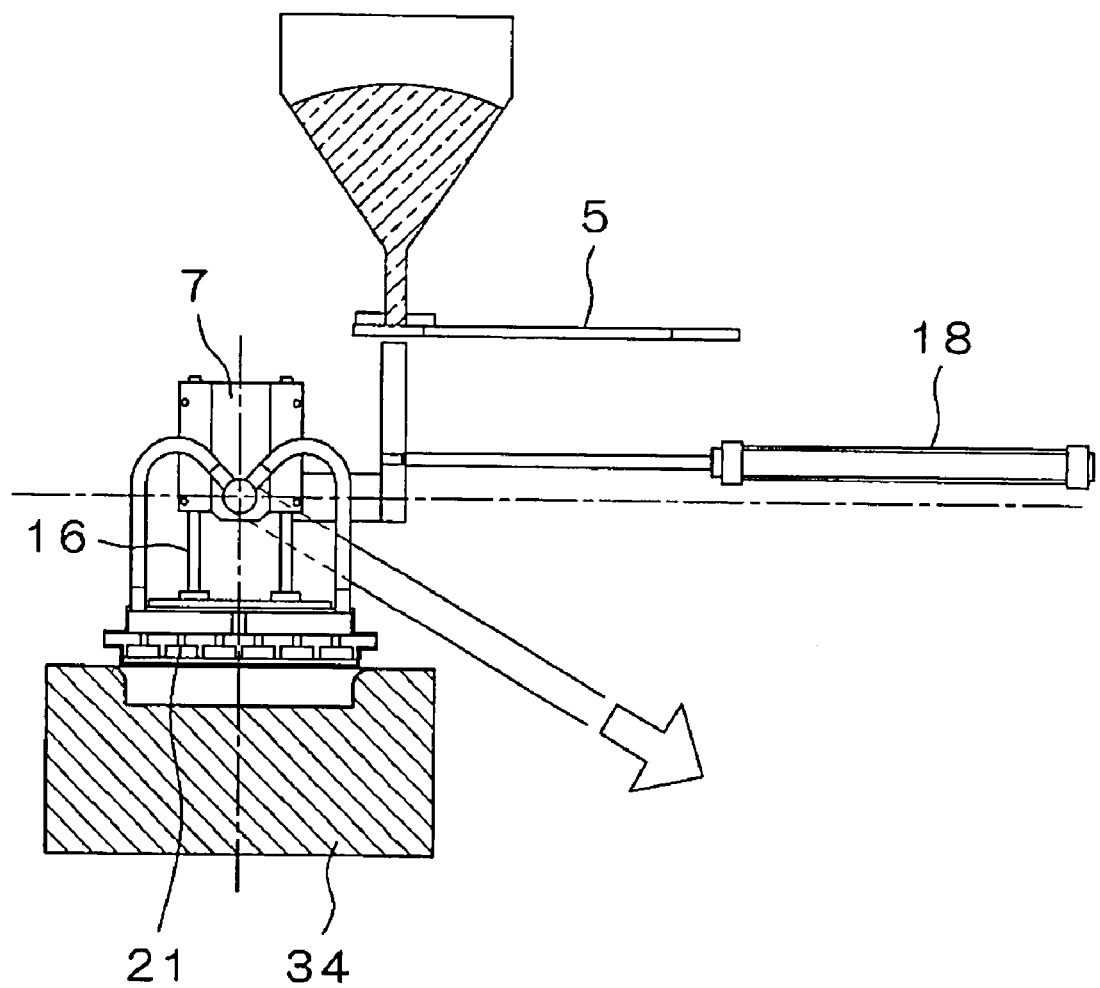
FIG. 8 is a vertical sectional view showing a transferring step in the vertical direction of the adsorption pad in a compression molding step of the same filling apparatus.

FIG. 7 shows a transferring step. More specifically, the adsorption pad 21 is transferred to a position directly above the female mold 34 with the vacuum pump 14 being actuated and the adsorption pad 21 is rotated 180° by actuation of the motor 12 to turn downward. Adsorption power by the vacuum pump 14 keeps the powder-particle material 3 from falling even in this state. FIG. 8 also shows a transferring step. More specifically, the actuating rods 16 of the movable cylinder 7 move forth with the vacuum pump 14 being actuated and the adsorption pad 21 descends to a position adjacent to the female mold 34.

Figure 9:
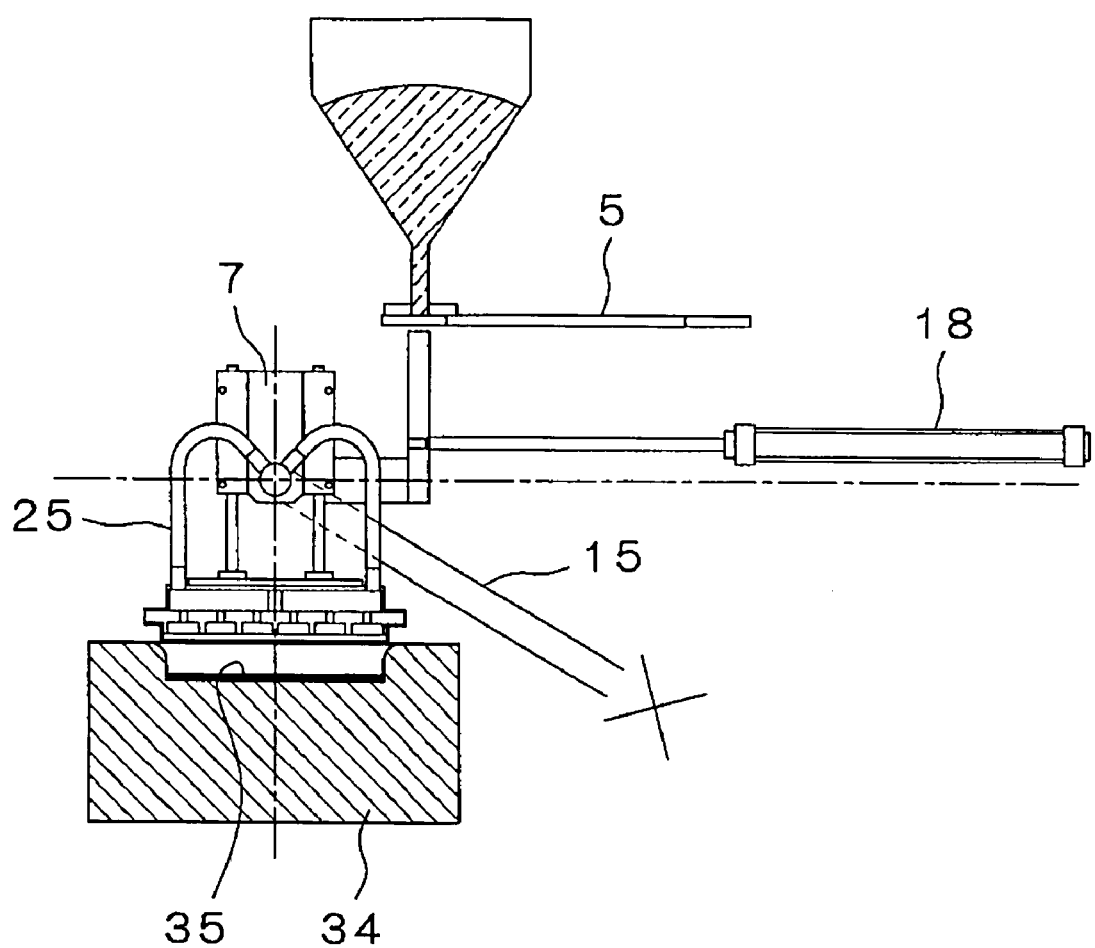
FIG. 9 is a vertical sectional view showing a filling step of powder-particle material in a compression molding step of the same filling apparatus.

FIG. 9 shows a filling step of powder-particle material. More specifically, since adsorption power disappears when the vacuum pump 14 stops, the powder-particle material 3 falls from the whole area of the vent member 30 at once and a powder-particle layer 35 is formed evenly in the female mold 34.

The procedure is then restored to the waiting step of FIG. 4 via a reverse step. It should be noted that air suction by the actuation of the vacuum pump 14 may be performed during the scraping step. In addition, the powder-particle material 3 may be laid in a scraped manner on the adsorption pad 21 while performing air suction with a lower pressure, thereafter, the adsorption pad 21 may be transferred to a position directly above the female mold 34 and be turned upside down while performing air suction with a higher pressure.

Embodiment 2

The following description will explain a manufacturing step by a filling apparatus of powder-particle material according to Embodiment 2 with reference to FIG. 10 to FIG. 14.

Figure 10:
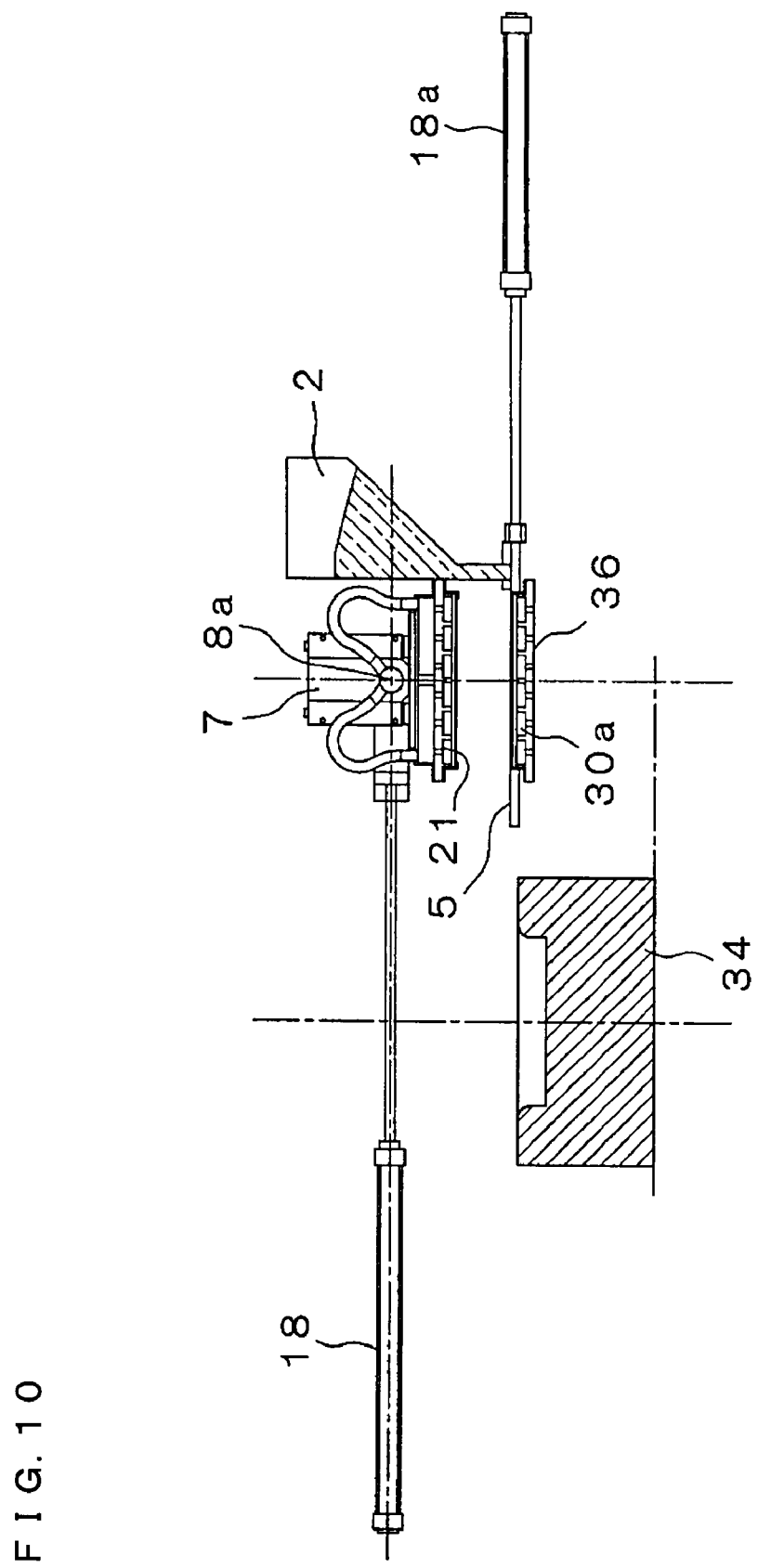
FIG. 10 is a vertical sectional view showing a waiting step in a compression molding step of a filling apparatus according to Embodiment 2 of the present invention.

FIG. 10 shows a waiting step of a filling apparatus of powder-particle material according to Embodiment 2.

In FIG. 10, the movable cylinder 7 is provided in a downward manner from the beginning and a motor for rotating the hollow shaft 8a is not provided. In addition, the scraping means 5 is provided so as to be reciprocable in the horizontal direction by a fixed cylinder 18a which is different from the fixed cylinder 18 for moving the movable cylinder 7. In addition, the scraping means 5 is provided with a holder pad 36 for receiving scraped powder-particle material. The holder pad 36 comprises a vent member 30a which is similar to the adsorption pad 21.

Figure 11:
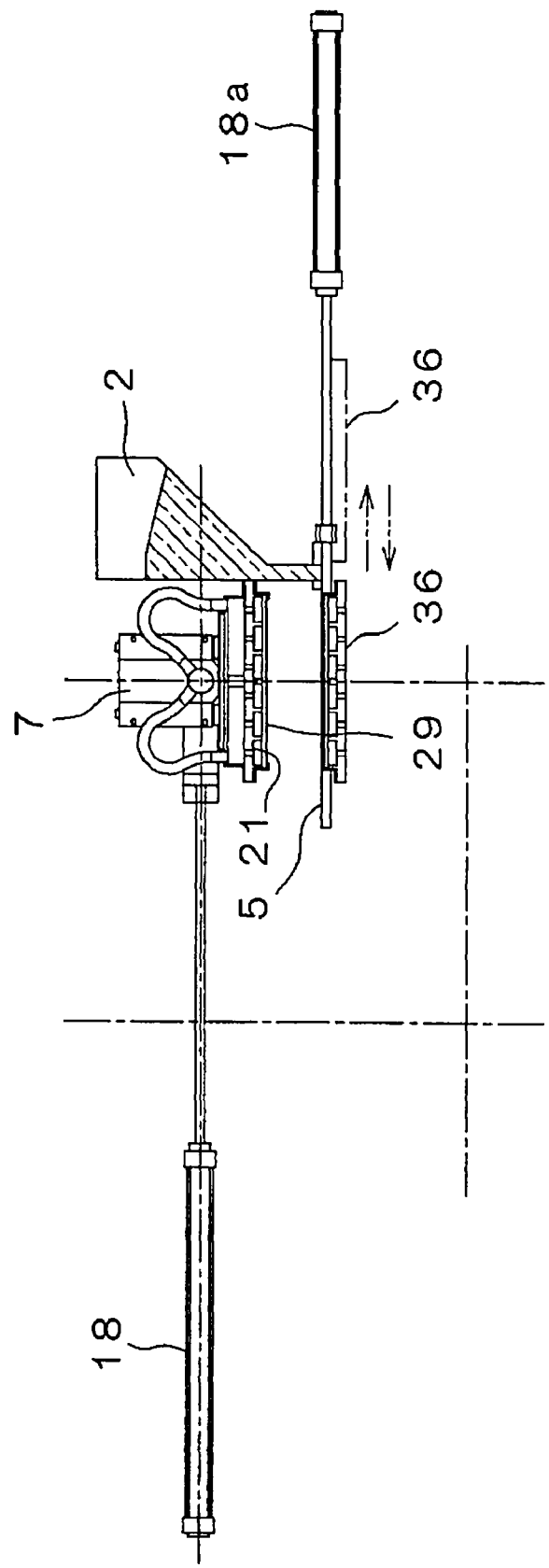
FIG. 11 is a vertical sectional view showing a scraping step in a compression molding step of the same filling apparatus.

FIG. 11 shows a scraping step. More specifically, by actuating the fixed cylinder 18a so as to cause the scraping means 5 and the holder pad 36 to make one round trip at the lower face of the material supply hopper 2 as shown by the arrows in long dashed double-short dashed line, the powder-particle material 3 is laid evenly in a scraped manner on the holder pad 36.

Figure 12:
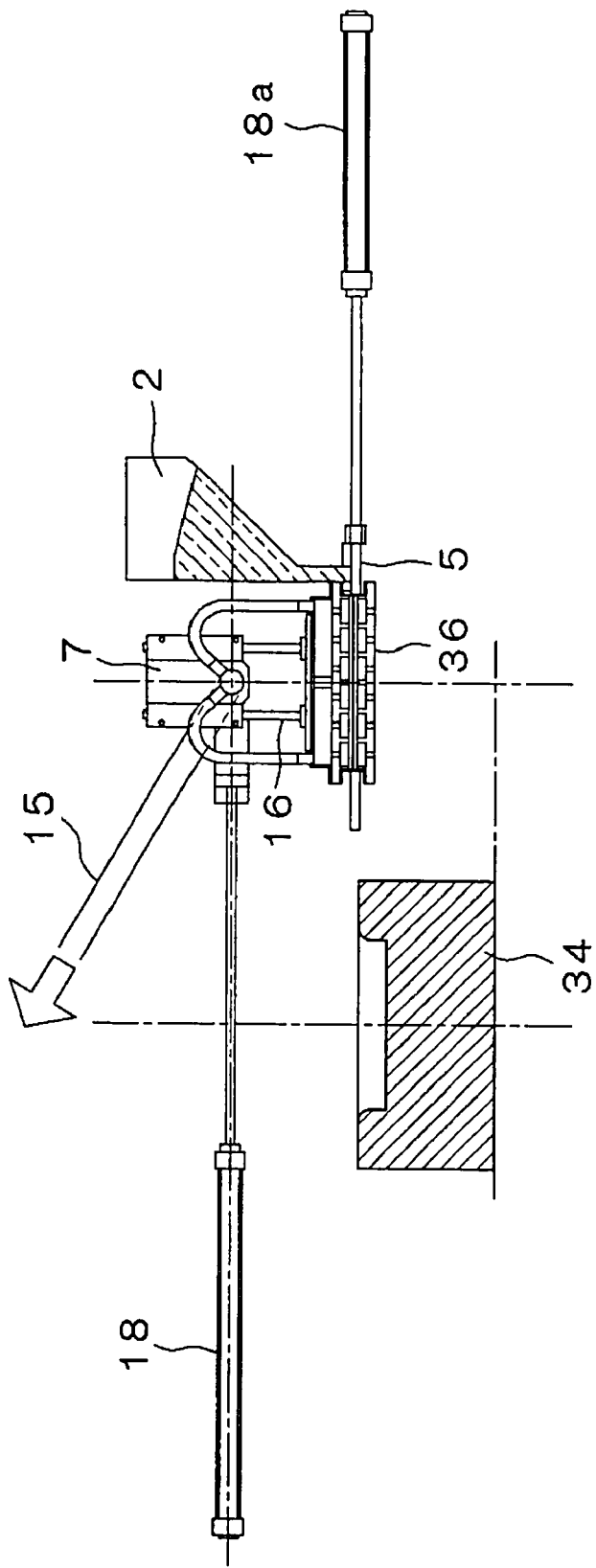
FIG. 12 is a vertical section showing an absorbing step of powder-particle material in a compression molding step of the same filling apparatus.

FIG. 12 shows an adsorbing step. More specifically, the powder-particle material 3 is adsorbed at the adsorption face 29 of the adsorption pad 21 by moving (downward) the actuating rods 16 of the movable cylinder 7 forth, causing the adsorption pad 21 to descend to the upper face of the holder pad 36, actuating the vacuum pump 14 and actuating the fixed cylinder 18a.

Figure 13:
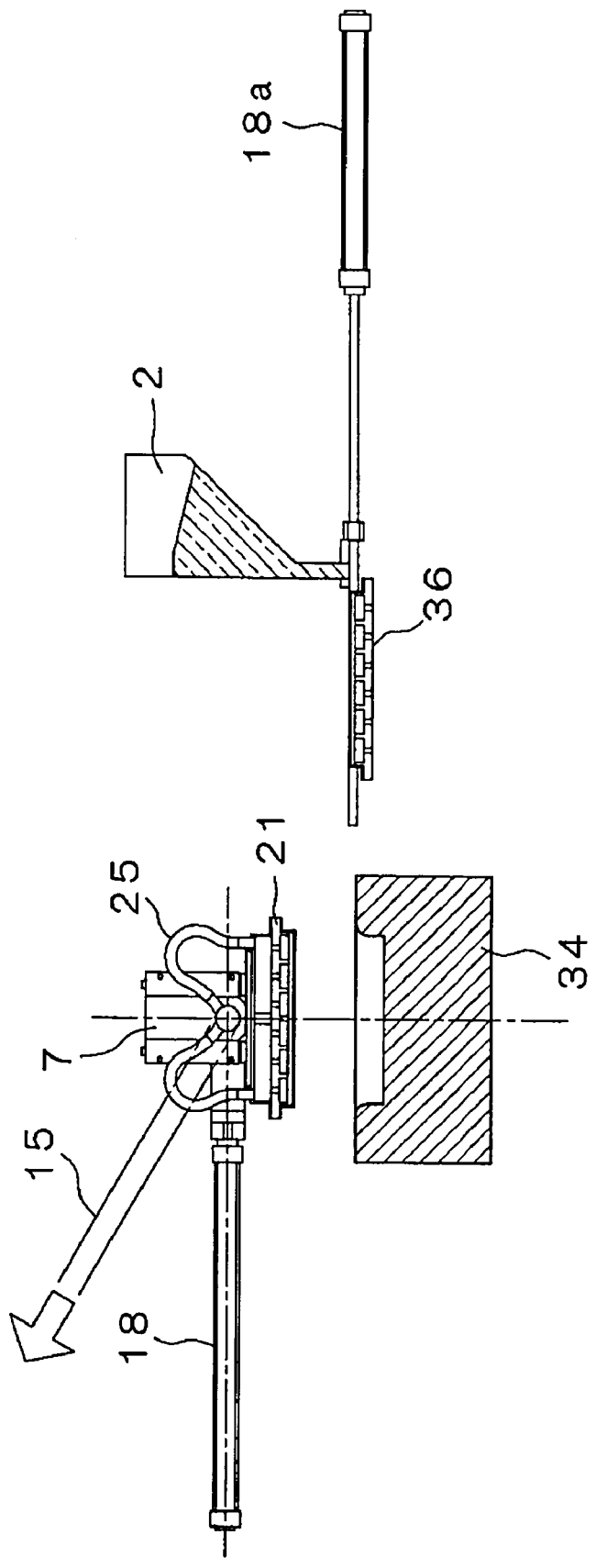
FIG. 13 is a vertical sectional view showing a transferring step of an adsorption pad in a compression molding step of the same filling apparatus.

FIG. 13 shows a transferring step. More specifically, with the vacuum pump 14 being actuated, the actuating rods 16 of the movable cylinder 7 are moved back so as to lift the adsorption pad 21 and detach the adsorption pad 21 from the holder pad 36, and the fixed cylinder 18 is actuated so as to move the adsorption pad 21 together with the movable cylinder 7 to a position above the female mold 34.

Figure 14:
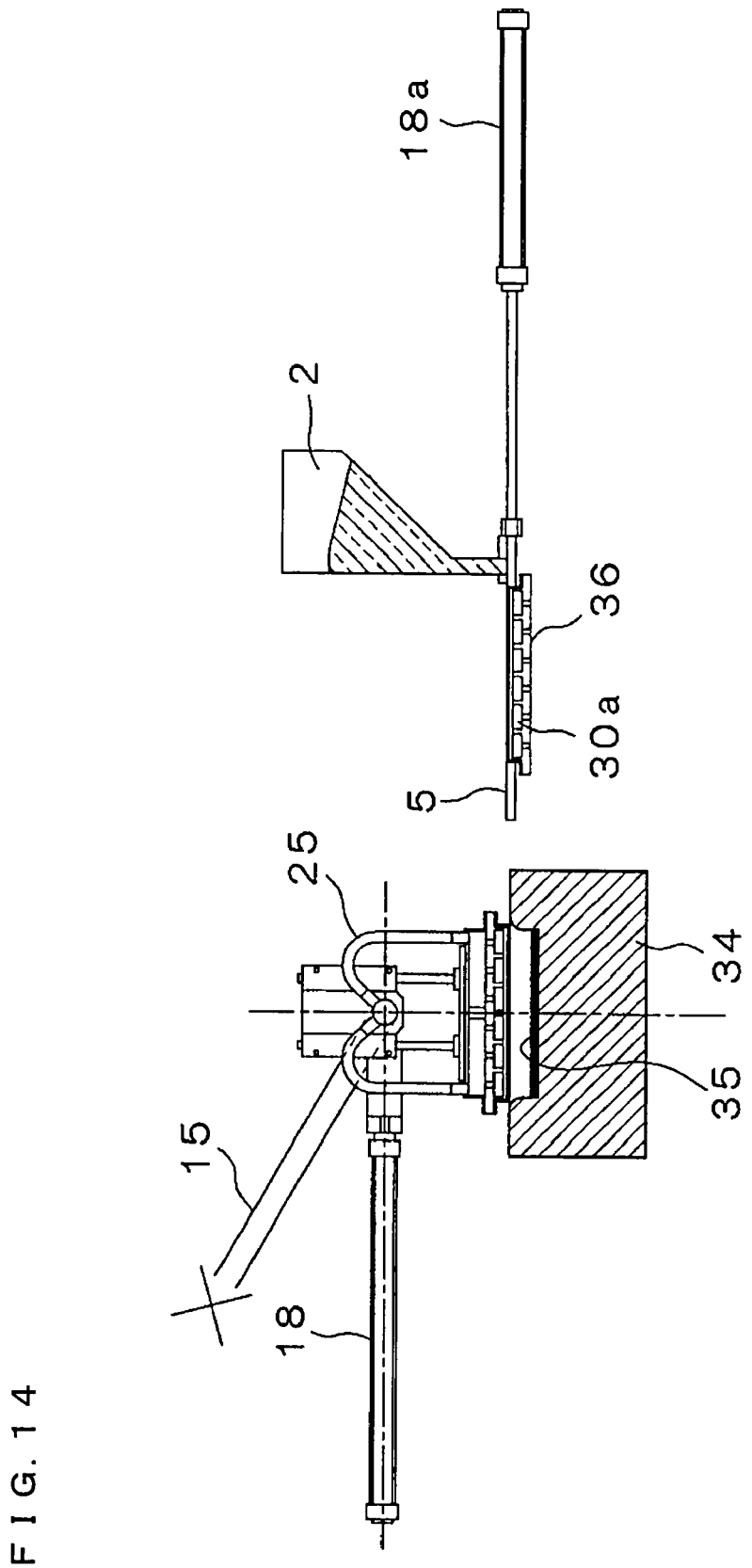
FIG. 14 is a vertical section showing a filling step of powder-particle material in a compression molding step of the same filling apparatus.
Figure 18:
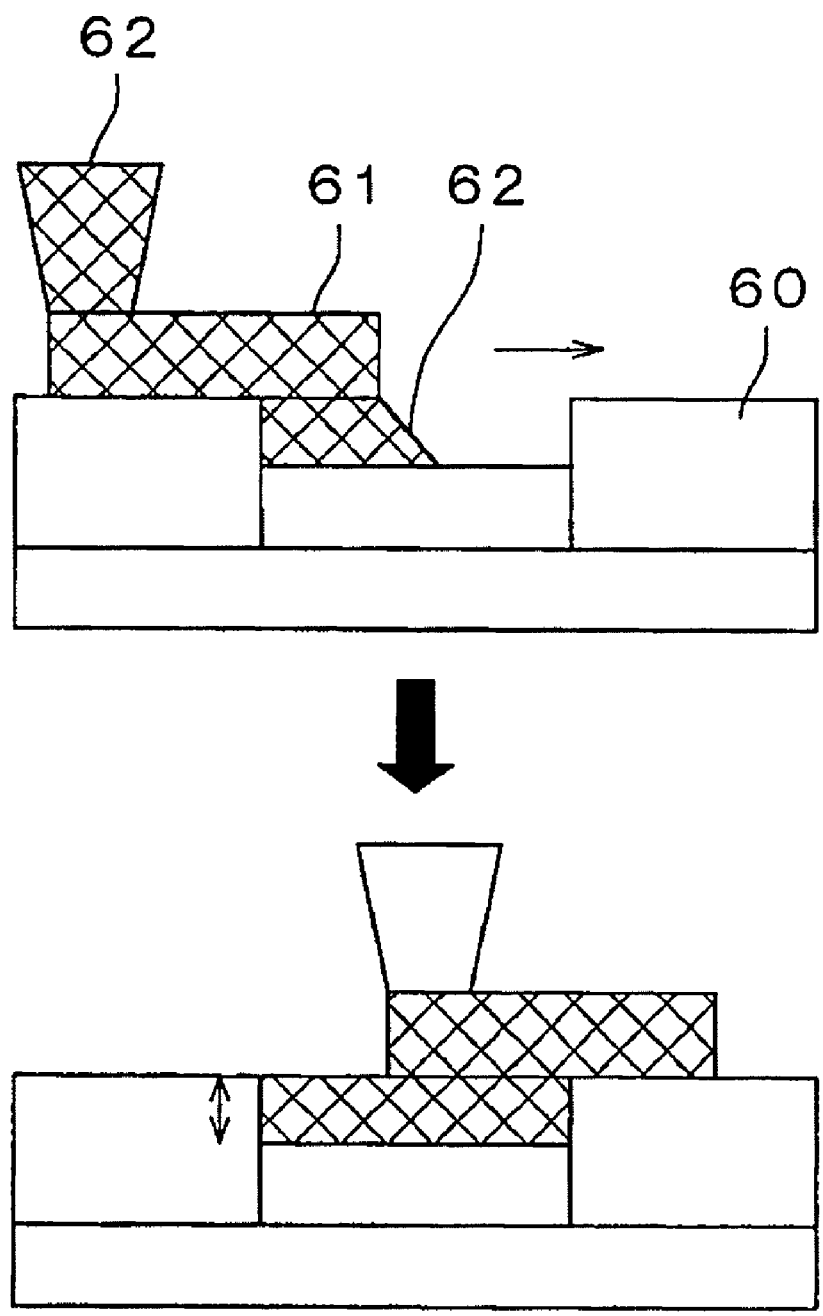
FIG. 18 is a side view showing a material supply method in a separator manufacturing apparatus of another conventional example.
Figure 19:
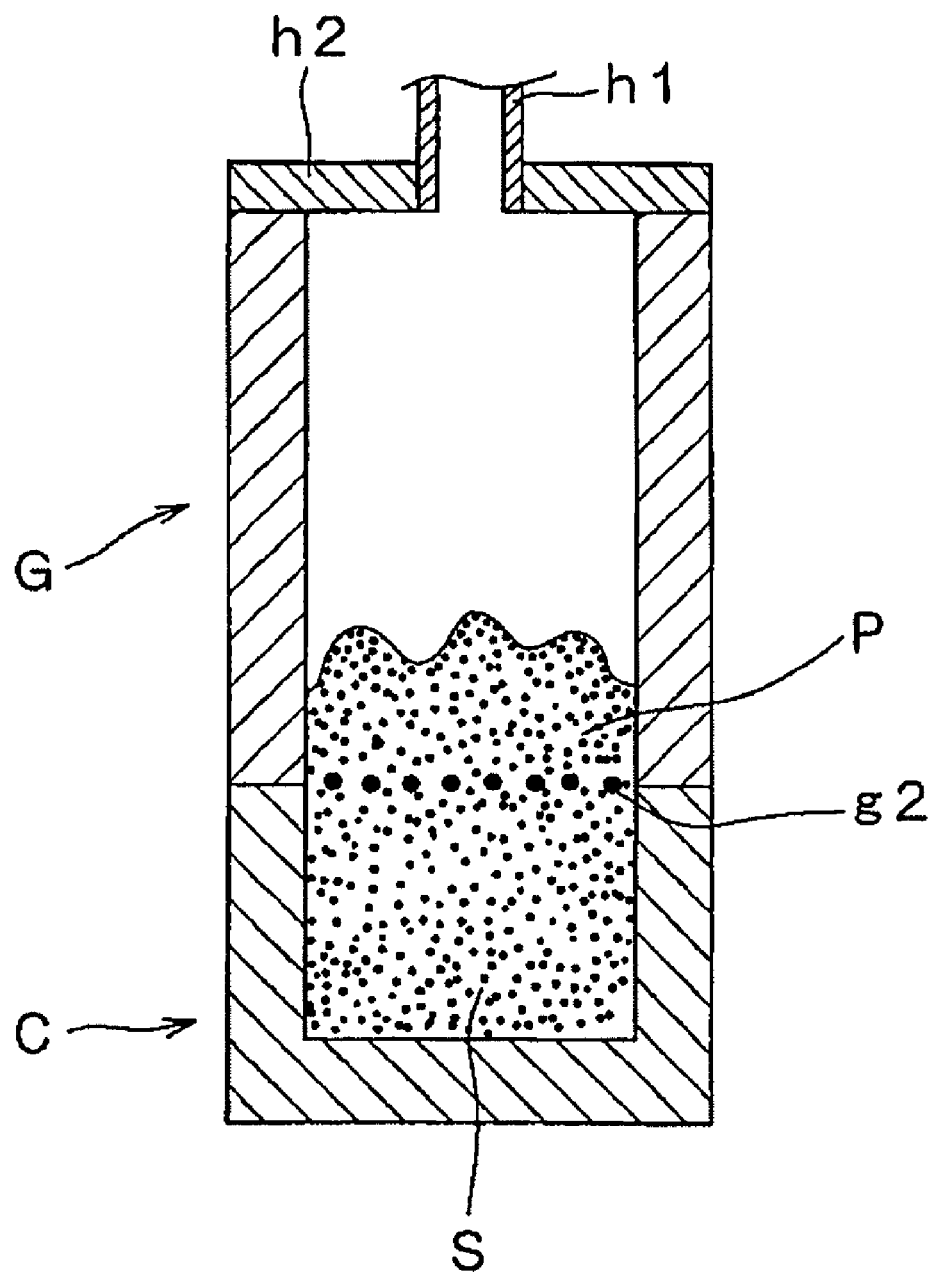
FIG. 19 is a side view showing a material supply method in a powder-particle material filling apparatus of yet another conventional example.

FIG. 14 shows a filling step of powder-particle material. More specifically, by moving the actuating rods 16 of the movable cylinder 7 forth again so as to cause the adsorption pad 21 to descend to the mold face and stopping the vacuum pump 14, the adsorption power disappears, the powder-particle material 3 falls from the whole area of the vent member 30 at once and a powder-particle layer 35 is formed evenly in the female mold 34.

The procedure is then restored to the waiting step of FIG. 10 via a reverse step.

Since scraping of the powder-particle material 3 is not performed at the mold face in each case of Embodiment 1 and Embodiment 2 described above, there is not a problem any more that diffused powder-particle material 3 melts and attaches to the mold face. Moreover, since a predetermined amount of the powder-particle material 3 which is scraped evenly is transferred using adsorption power and caused to fall, it is possible to fill powder-particle material 3 thinly and evenly as required.

Moreover, since a step of turning around the movable is cylinder 7 is unnecessary in Embodiment 2, it is possible to simplify steps.

Embodiment 3

The following description will explain Embodiment 3 with reference to FIG. 15 and FIG. 16. FIG. 15 is a perspective view of an adsorption pad 211 to be used in Embodiment 3 and FIG. 16 is a perspective view showing another example of an adsorption pad 212 likewise.

Denoted at 37 in FIG. 15 is a section sheet which is provided at the surface of the vent member 30 of the adsorption pad 211. The section sheet 37 is made of thin resin material and sectioned into a number of cubicles 39 by a section 38. It should be noted that all the cubicles 39 are formed to have the same area.

When such a section sheet 37 is provided, it is possible to prevent the powder-particle material 3 adsorbed at the surface of the vent member 30 from moving out of the cubicles 39. Moreover, since suction power acts slightly even on the surface of the section 38, the powder-particle material 3 does not fall from the section 38 during transfer. In addition, since the powder-particle material 3 is divided evenly into the respective cubicles 39 and adsorbed, the powder-particle material 3 is filled evenly also in the female mold 34.

Denoted at 40 in FIG. 16 is a section sheet which is provided at the surface of the vent member 30 of the adsorption pad 212. The section sheet 40 is made of thin resin material and sectioned into a plurality of cubicles 42a and 42b by a section 41. The cubicles 42a are formed at a central portion of the section sheet 40 and have a smaller area than the cubicles 42b which are formed at a periphery portion.

With such a structure, air suction power acting on the periphery portion of the vent member 30 becomes relatively large and the adsorption amount of the powder-particle material 3 at the periphery portion can become large as a result.

By changing the area of the cubicles 42a and 42b as described above, it is possible to vary the distribution of the powder-particle material 3 at the adsorption face and react to required terms of molded objects without replacing the vent member 30.

INDUSTRIAL APPLICABILITY

The present invention makes it possible to fill powder-particle material thinly, evenly and rapidly in a mold in compression molding and is extremely useful industrially.

The invention claimed is:

1. A filling apparatus of powder-particle material, comprising:
a material supply hopper for retaining powder-particle material for compression molding and discharging powder-particle material from a supply port at a lower portion;

an adsorption pad for receiving discharged powder-particle material at a lower side of the material supply hopper;

a scraping unit for evenly scraping a predetermined amount of powder-particle material, which is laid on the adsorption pad, depending on a female mold;

an air suction unit for adsorbing and holding powder-particle material, which is continuously laid in a scraped manner on the adsorption pad; and a transfer unit which can transfer the adsorption pad and freely turn the adsorption pad upside down in a space between the material supply hopper and the female mold with the powder-particle material being adsorbed and held, wherein the air suction unit stops air suction to cause powder-particle material to fall from the adsorption pad into the female mold.

2. The filling apparatus of powder-particle material according to claim 1, wherein the adsorption pad has a cavity portion, which communicates with the air suction unit, inside thereof and comprises a vent member, which consists of sintered metal or a proper filter or a combination thereof, at the adsorption face.

3. The filling apparatus of powder-particle material according to claim 2, wherein a section sheet for sectioning external surface of the vent member into a number of cubicles is provided.

4. The filling apparatus of powder-particle material according to claim 3, wherein the cubicles of the section sheet are sectioned so as to have a smaller area in a central portion than in a periphery portion of the external surface of the vent member.

5. The filling apparatus of powder-particle material according to claim 1, wherein the adsorption pad has a cavity portion inside thereof and the cavity portion is sectioned into a number of cubicles.

6. A filling apparatus of powder-particle material, comprising:

a material supply hopper for retaining powder-particle material for compression molding and discharging powder-particle material from a supply port at a lower portion;

a holder pad for receiving discharged powder-particle material at a lower side of the material supply hopper;

a scraping unit for evenly scraping a predetermined amount of powder-particle material, which is laid on the holder pad, depending on a female mold;

an adsorption pad having an adsorption face at a lower face;

an air suction unit for adsorbing and holding powder-particle material, which is continuously laid in a scraped manner on the holder pad, at the adsorption face of the adsorption pad; and a transfer unit which can transfer the adsorption pad in a space between the material supply hopper and the female mold with the powder-particle material being adsorbed and held, wherein the air suction unit stops air suction to cause powder-particle material to fall from the adsorption pad into the female mold.

7. The filling apparatus of powder-particle material according to claim 6, wherein the adsorption pad has a cavity portion, which communicates with the air suction unit, inside thereof and comprises a vent member, which consists of sintered metal or a proper filter or a combination thereof, at the adsorption face.

8. The filling apparatus of powder-particle material according to claim 7, wherein a section sheet for sectioning external surface of the vent member into a number of cubicles is provided.

9. The filling apparatus of powder-particle material according to claim 8, wherein the cubicles of the section sheet are sectioned so as to have a smaller area in a central portion than in a periphery portion of the external surface of the vent member.

10. The filling apparatus of powder-particle material according to claim 6, wherein the adsorption pad has a cavity portion inside thereof and the cavity portion is sectioned into a number of cubicles.

11. The filling apparatus of powder-particle material according to claim 6, wherein the holder pad comprises a vent member consisting of sintered metal or a proper filter or a combination thereof.

12. A filling method of powder-particle material comprising steps of:

laying powder-particle material in a scraped manner on an adsorption pad;

adsorbing powder-particle material at an adsorption face of the adsorption pad by air suction;

transferring the adsorption pad to an upper side of a female mold; and filling powder-particle material by stopping air suction to cause powder-particle material to fall into the female mold.

13. The filling method of powder-particle material according to claim 12, further comprising a step of:

turning the adsorption pad upside down when transferring the adsorption pad to the upper side of the female mold.

14. A filling method of powder-particle material comprising steps of:

laying powder-particle material in a scraped manner on a permeable holder pad;

adsorbing powder-particle material, which is laid on the holder pad, at an adsorption face provided at a lower face of an adsorption pad by air suction;

transferring the adsorption pad to an upper side of a female mold; and filling powder-particle material by stopping air suction to cause powder-particle material to fall into the female mold.

* * * * *